United States Patent [19]

Young

[11] Patent Number: 4,510,539

[45] Date of Patent: Apr. 9, 1985

[54] CONTINUOUS LOOP CASSETTE CHANGER APPARATUS FOR A DICTATION/TRANSCRIPTION SYSTEM

[75] Inventor: Jeffrey E. Young, Atlanta, Ga.

[73] Assignee: Lanier Business Products, Inc., Ga.

[21] Appl. No.: 334,975

[22] Filed: Dec. 28, 1981

[51] Int. Cl.³ ................... G11B 15/68; B65G 43/10; B65G 37/00

[52] U.S. Cl. ............................... 360/92; 198/575; 198/580

[58] Field of Search .................. 360/92, 91, 71, 69; 242/197–200, 180–181; 352/6–8; 369/25–27; 198/580, 472, 575

[56] References Cited

U.S. PATENT DOCUMENTS

| | | |
|---|---|---|
| 3,127,178 | 3/1964 | Osborne et al. . |
| 3,484,055 | 12/1969 | Raine . |
| 3,511,508 | 5/1970 | Ban . |
| 3,512,785 | 5/1970 | Ban . |
| 3,524,949 | 8/1970 | Kleve . |
| 3,578,335 | 5/1971 | Ban . |
| 3,578,336 | 5/1971 | Ban . |
| 3,578,733 | 6/1971 | Piotrowski . |
| 3,578,879 | 6/1971 | Ban . |
| 3,579,187 | 7/1971 | Ban . |
| 3,592,975 | 7/1971 | Ban . |
| 3,599,986 | 8/1971 | Ban . |
| 3,599,987 | 8/1971 | Ban . |
| 3,617,066 | 11/1971 | Foelkel . |
| 3,643,962 | 2/1972 | White et al. . |
| 3,650,413 | 3/1972 | Weigel . |
| 3,667,624 | 6/1972 | Ogura et al. . |
| 3,697,083 | 10/1972 | Ban . |
| 3,698,722 | 10/1972 | Ban . |
| 3,758,122 | 9/1973 | Kawaharasaki . |
| 3,766,327 | 10/1973 | Johnson et al. . |
| 3,779,560 | 12/1973 | Yokata . |
| 3,807,741 | 4/1974 | Uemura . |
| 3,934,700 | 1/1976 | Schubert et al. ............... 198/580 X |
| 3,996,617 | 12/1976 | Cousino . |
| 4,014,428 | 3/1977 | Ossbahr .......................... 198/472 X |
| 4,024,354 | 5/1977 | Bolick, Jr. et al. ............... 360/92 X |
| 4,040,533 | 8/1977 | De Boer et al. ................. 198/472 X |
| 4,071,857 | 1/1978 | Whitney et al. . |
| 4,088,220 | 5/1978 | Jacksch et al. ...................... 198/472 |
| 4,092,679 | 5/1978 | Sander et al. . |
| 4,092,685 | 5/1978 | Sander et al. .......................... 360/92 |
| 4,099,209 | 7/1978 | Sander et al. . |
| 4,113,082 | 9/1978 | Timin .............................. 198/580 X |
| 4,145,724 | 3/1979 | Medding et al. . |
| 4,164,765 | 8/1979 | Cysling . |
| 4,247,876 | 1/1981 | Bolick, Jr. . |
| 4,271,440 | 1/1981 | Jenkins et al. . |
| 4,381,527 | 4/1983 | Titus et al. ............................ 360/92 |
| 4,386,382 | 5/1983 | Cutler et al. .......................... 360/92 |

FOREIGN PATENT DOCUMENTS

| | | |
|---|---|---|
| 2241071 | 3/1973 | Fed. Rep. of Germany . |
| 2702808 | 7/1978 | Fed. Rep. of Germany . |
| 1499320 | 2/1978 | United Kingdom . |

OTHER PUBLICATIONS

The American Heritage Dictionary, ©1969, p. 291.

Primary Examiner—Aristotelis M. Psitos
Attorney, Agent, or Firm—Jones & Askew

[57] ABSTRACT

A continuous loop cassette changer apparatus for a dictation/transcription system transfers tape cassettes from a first storage location to a dictation record/listen station, to a second storage location, to a transcription listen station, and then back to the first storage location for eventual re-recording all without manual handling cassettes. The cassettes are transferred in an upright position. Dictation on a sequence of cassettes can proceed independently of simultaneous transcription of another sequence of cassettes. A priority eject mechanism is provided to remove cassettes containing priority dictation from the continuous loop.

2 Claims, 21 Drawing Figures

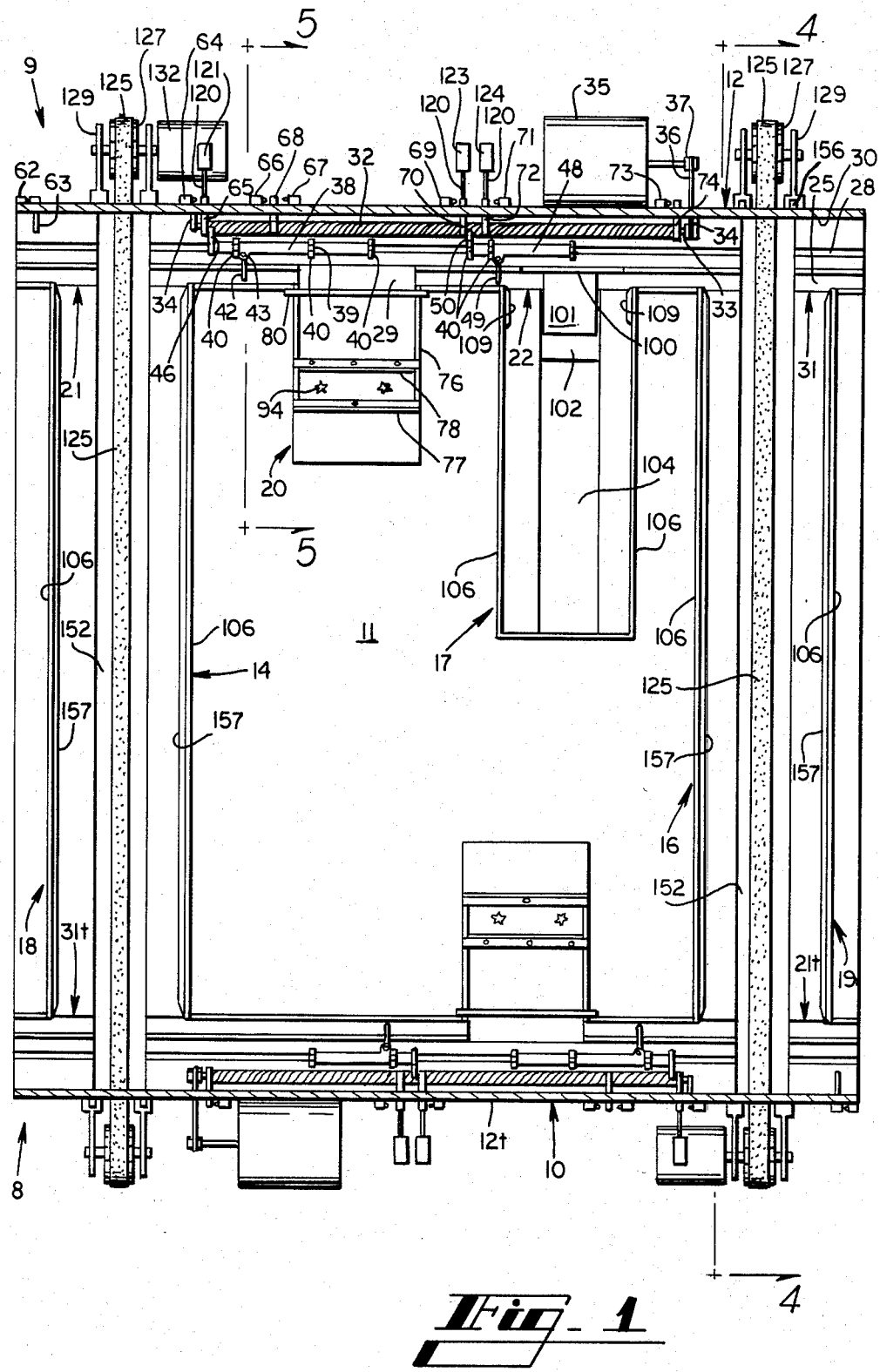

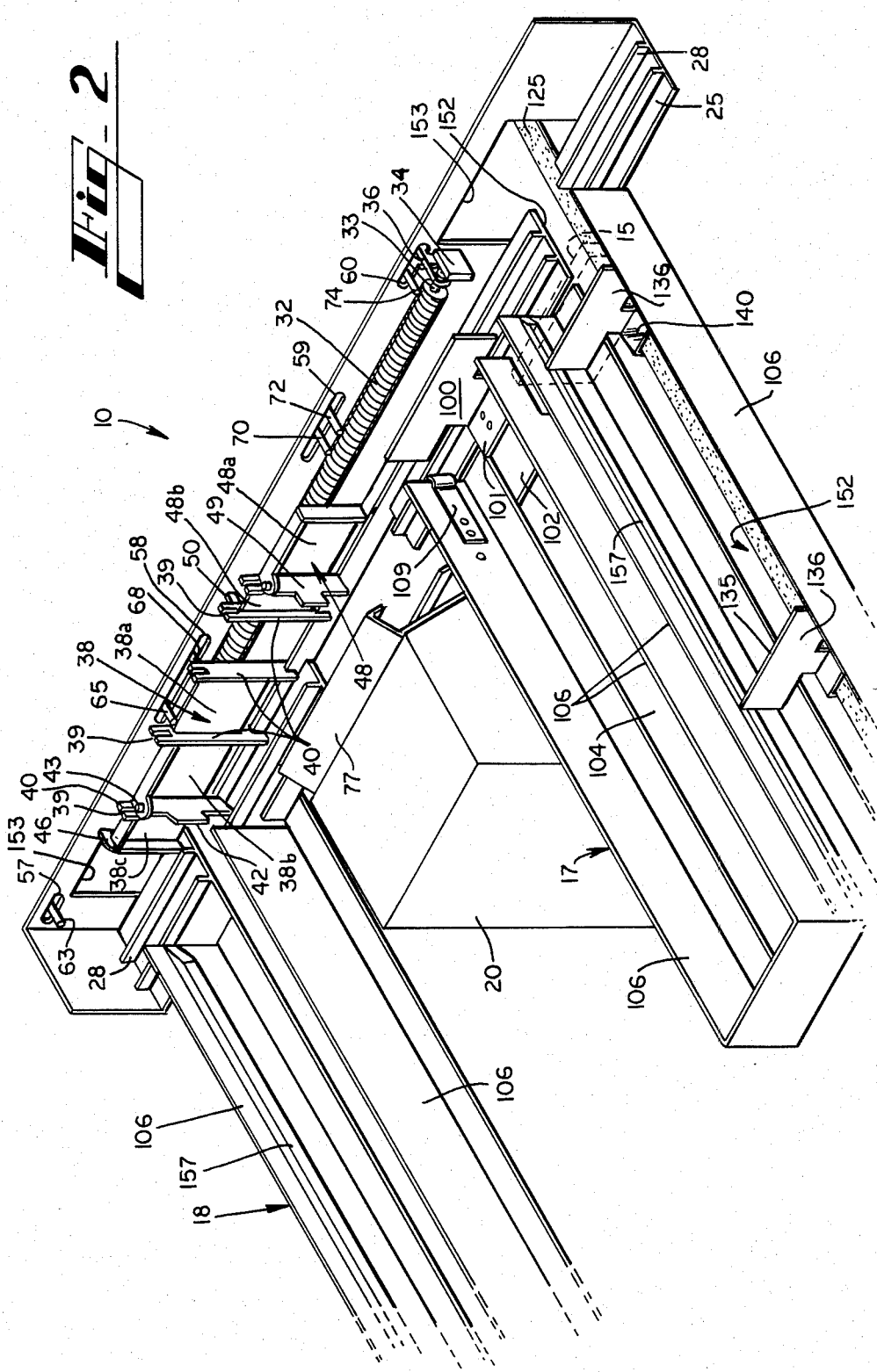

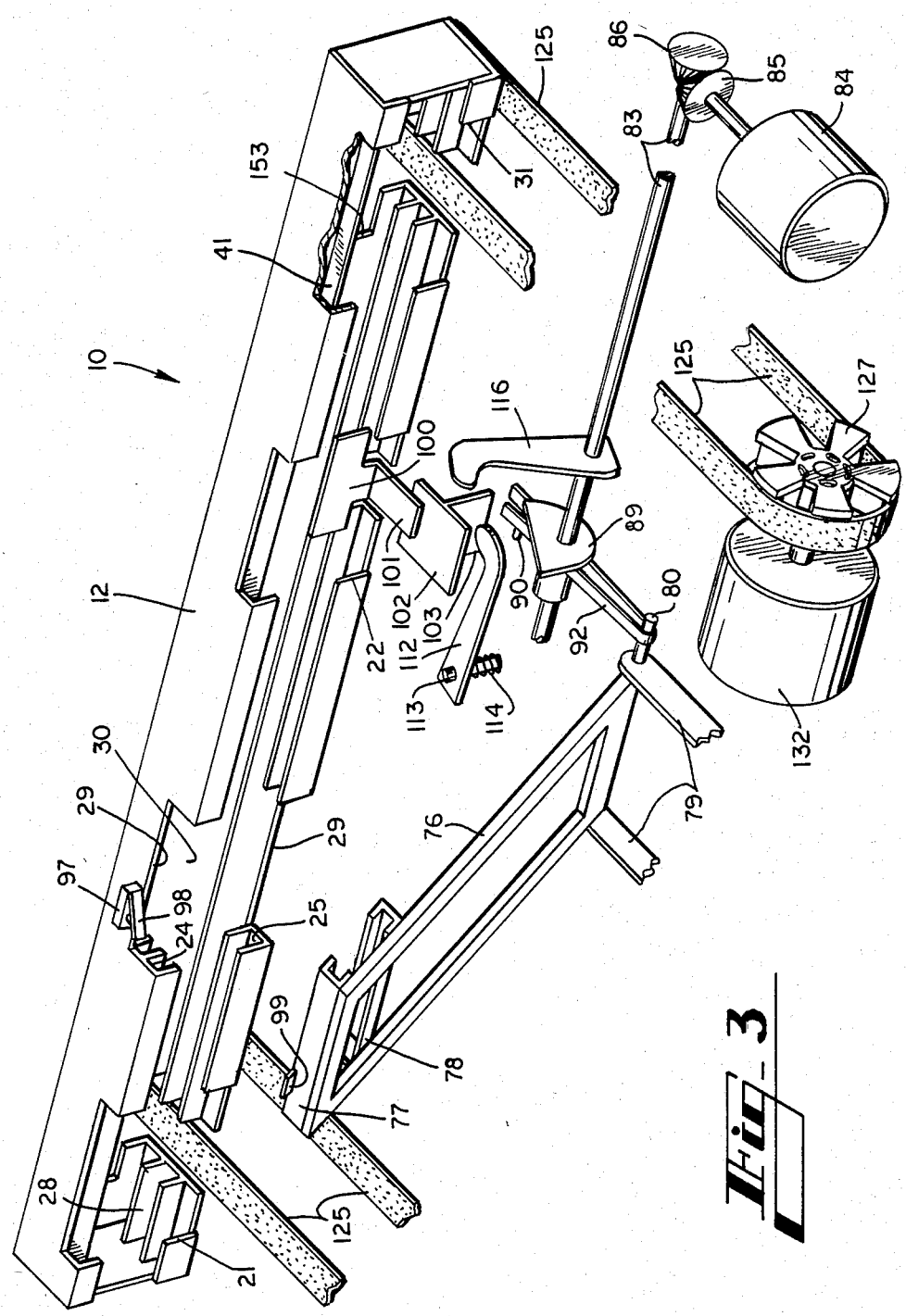

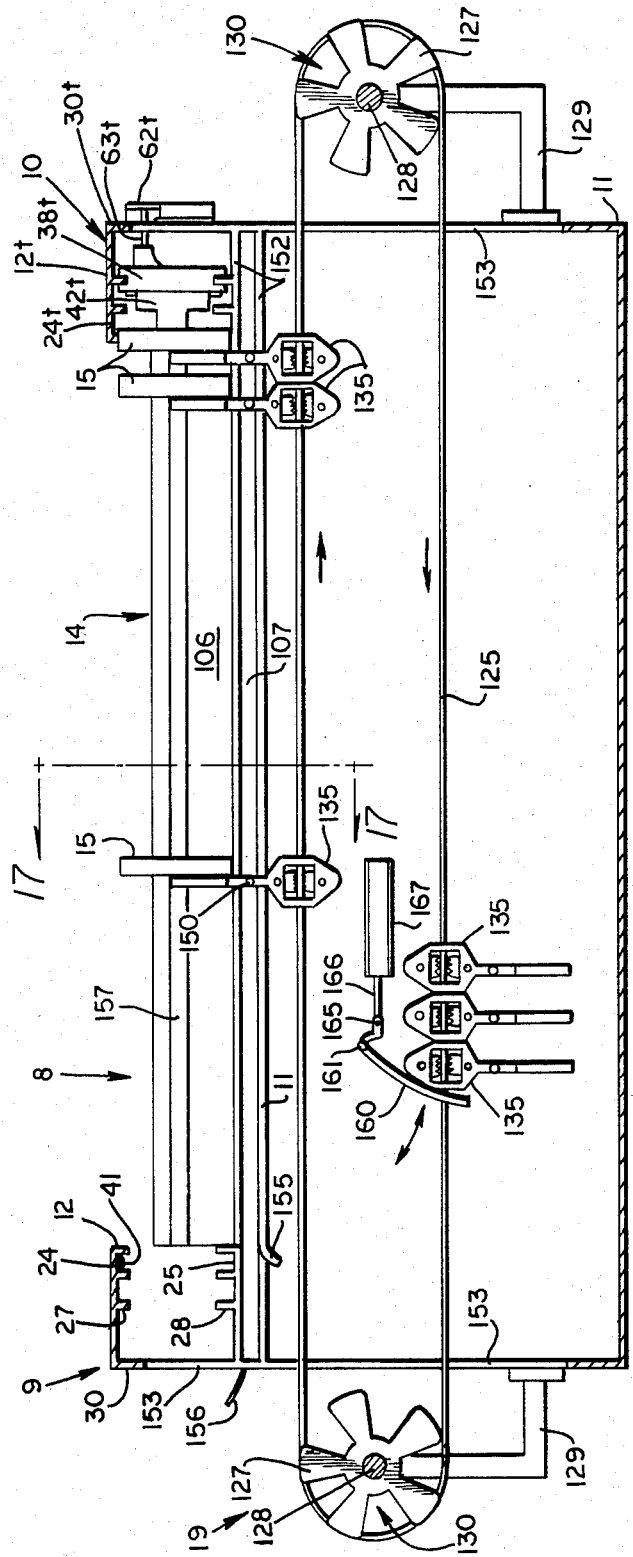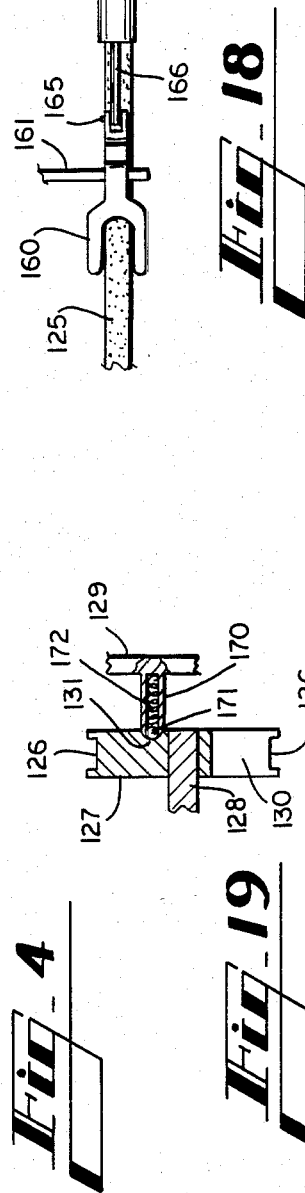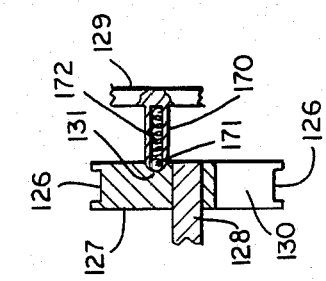

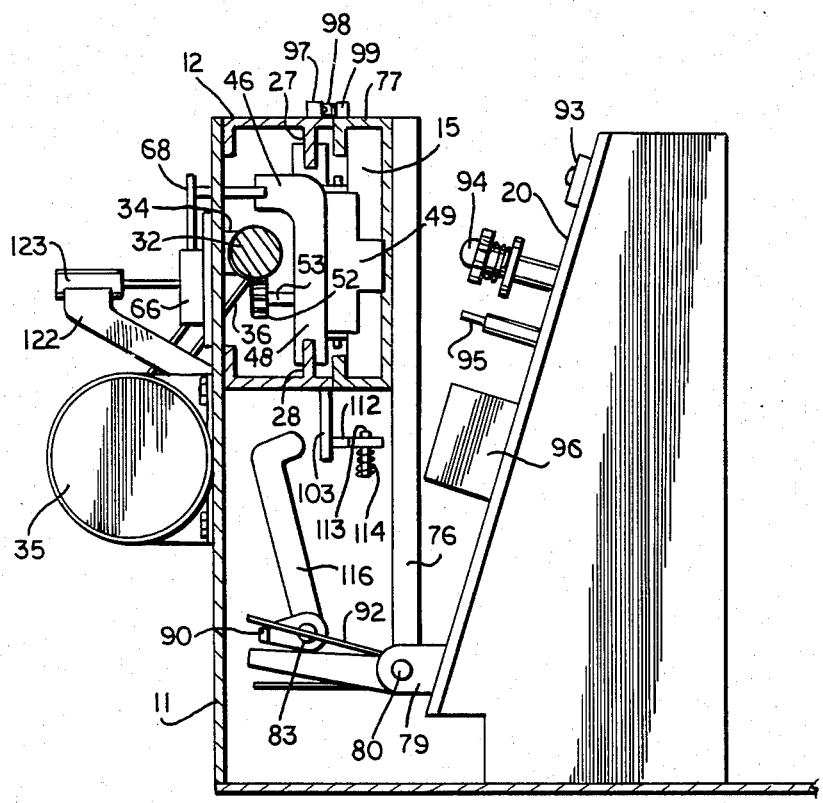
Fig_5
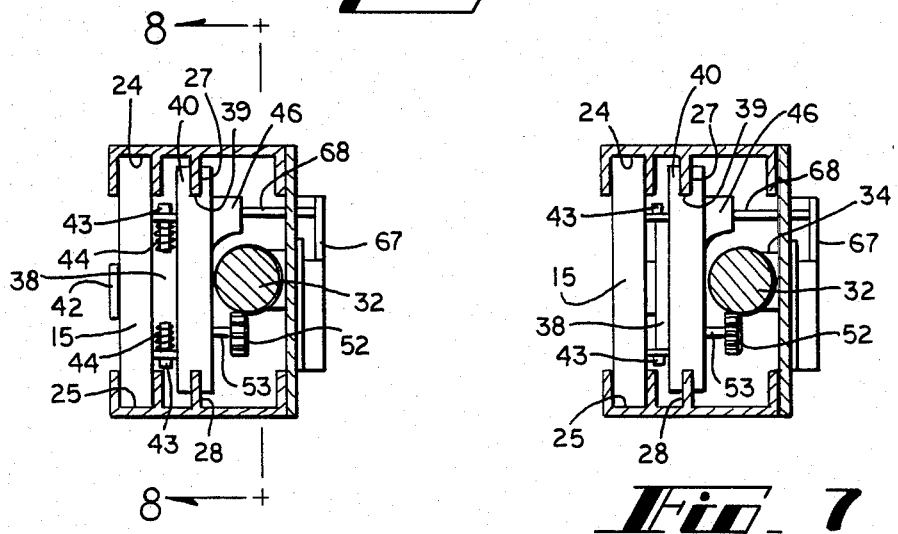
Fig_6  Fig_7

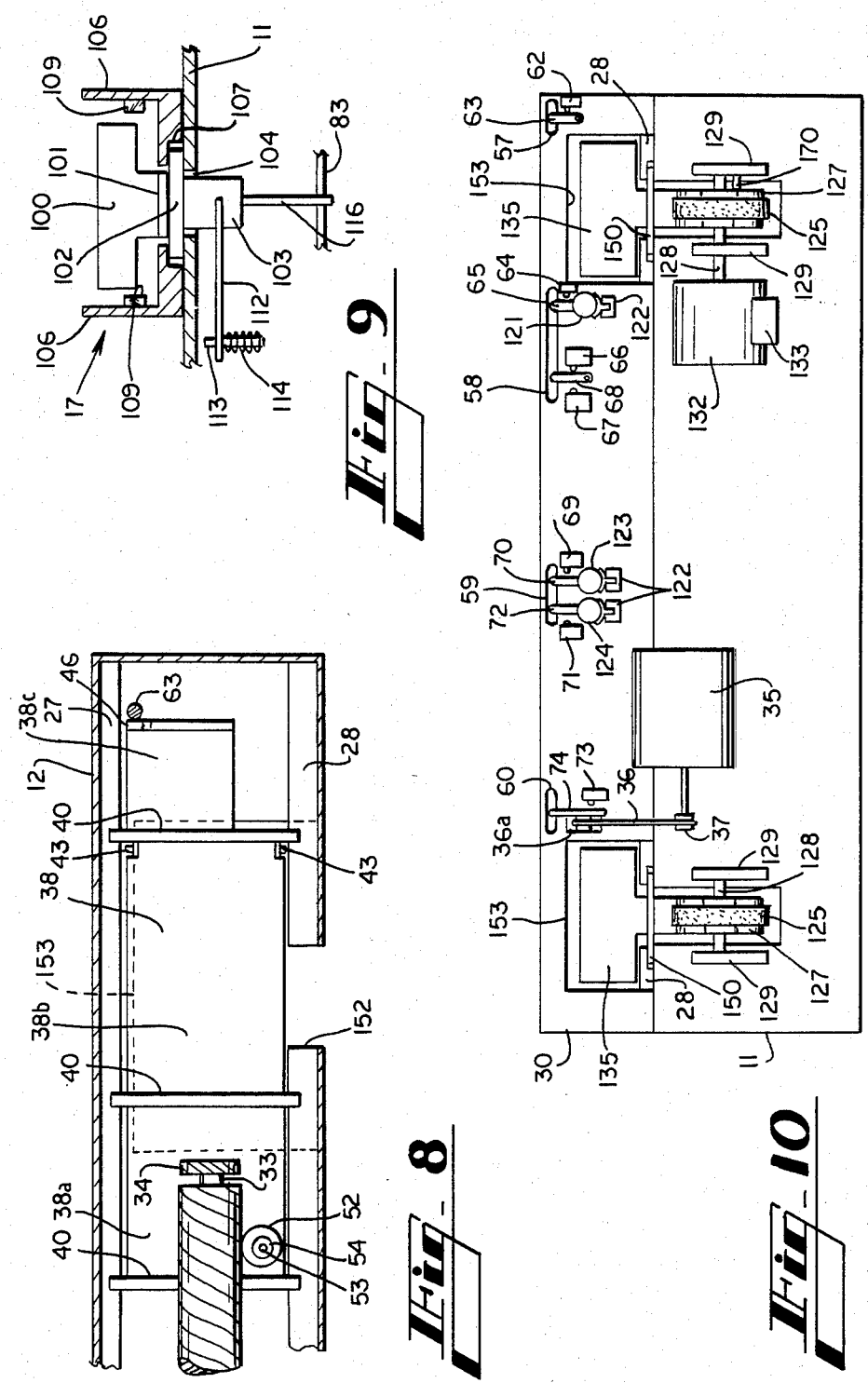

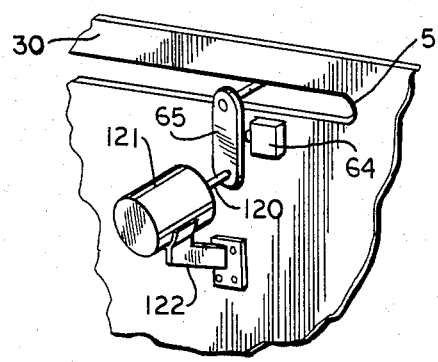
Fig_11
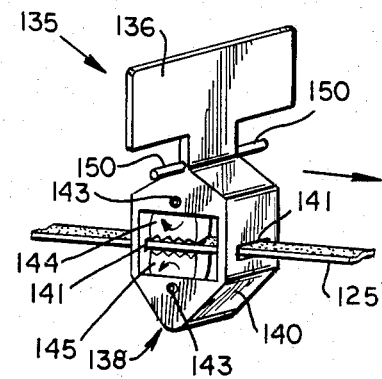
Fig_12
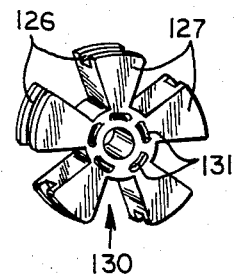
Fig_13
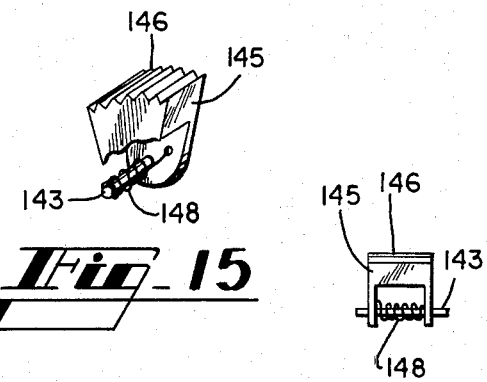
Fig_15
Fig_16
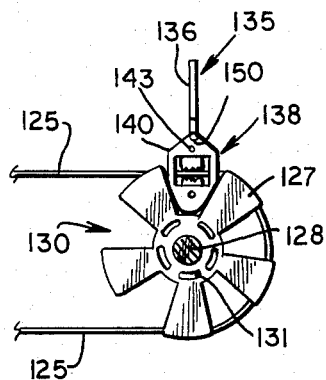
Fig_14
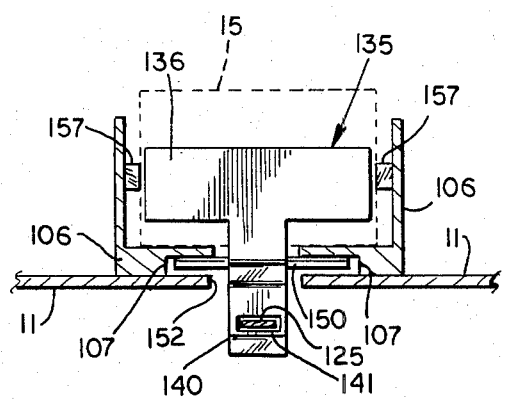
Fig_17

CONTINUOUS LOOP CASSETTE CHANGER APPARATUS FOR A DICTATION/TRANSCRIPTION SYSTEM

TECHNICAL FIELD

The present invention relates to systems for mechanically handling discrete recording media, and more particularly relates to cassette changing systems in centralized dictation/transcription systems.

BACKGROUND ART

In the dictation/transcription art, two types of central dictation/transcription systems have been developed. In endless loop tape systems, such as the one shown in U.S. Pat. No. 3,467,790, separate transducers are provided for the dictating and transcribing persons to permit the dictating person to record and review dictation recorded on the medium at the same time as the transcribing person is listening to dictation recorded at a different location on the same medium.

The other type of known central dictation system utilizes discrete recording media, such as tape cassettes. In the central cassette changer system shown in U.S. Pat. No. 4,024,354, the cassette changer substitutes a fresh cassette for recording either automatically when the previous cassette is completely used, or when the dictating person causes control circuitry to substitute a fresh cassette for a cassette that has been partially used. In prior art central cassette changer systems, recorded cassettes have been manually carried to transcriptionists for transcription of the dictation recorded thereon.

Thus, central cassette changer systems have lacked the advantage of simultaneous recording and transcribing without manual intervention in the system, as is the case in endless loop systems. On the other hand, endless loop systems do not have the versatility for determining the order of transcription that is inherent in prior art central cassette changer systems. For example, a high priority unit of dictation can be manually dictated on a separate cassette which can be manually retrieved from the system and transcribed before cassettes that were recorded earlier. A system for ejecting cassettes holding priority dictation into a special location is shown in U.S. Pat. No. 4,092,685.

SUMMARY OF THE INVENTION

Generally described, the present invention provides a continuous loop cassette changer apparatus for a dictation/transcription system. A succession of cassettes is transported to a dictation station for recording of dictation, and then to a transcription station for transcribing of the dictated material recorded on the cassettes, and then again to the dictation station for recording of new material, all without manual handling of the cassettes.

More particularly described, the present invention comprises an improvement in a dictation/transcription apparatus, the apparatus including a first storage location for storing a plurality of recording cassettes, a dictation record/listen station, a means for conveying individual cassettes from the first storage location to the dictation record/listen station, a second storage location for storing a plurality of the cassettes, and a means for conveying the individual cassettes from the dictation record/listen station to the second storage location; and the improvement comprising a transcription listen station, a means for conveying individual cassettes from the second storage location to the transcription listen station, and a means for conveying the individual cassettes from the transcription listen station to the first storage location.

Preferably, the cassette conveying means comprise channels passing adjacent to the dictation record/listen station and the transcription listen station, respectively, and means for sliding individual cassettes along the channels to appropriate positions for loading onto the dictation record/listen and transcription listen stations or for ejection from the channels. The storage locations preferably comprise transfer means for removing cassettes that have been recorded or transcribed from the appropriate channel, holding the cassettes until they are required to be loaded into the other channel for transcribing of dictation recorded thereon or recording of new dictation thereon, and loading such cassettes into the opposite channel when so required. A priority output tray can be provided at a location along the channel passing adjacent to the dictation record/listen station, as well as a means for ejecting cassettes containing priority units of dictation into the priority tray rather than into the second storage location. Furthermore, the storage locations can be exposed so that cassettes can be removed therefrom manually at any time, if desired.

An important advantage of the present invention is that cassettes are transferred between the dictation record/listen station and the transcription listen station while being continuously maintained in an upright orientation, which is the orientation required for loading onto the dictation and transcription stations.

Thus, it is an object of the present invention to provide a continuous loop cassette changer apparatus to facilitate dictation and transcription on a plurality of recording cassettes repeatedly without manual handling of the cassettes.

It is a further object of the present invention to provide a continuous loop cassette changer apparatus that transports a plurality of recording cassettes between a dictation station and a transcription station, and that permits a succession of recording cassettes to be utilized at one of such stations both simultaneously with utilization of others of the cassettes at the other of such stations, and independently of the number of cassettes being utilized at the other of such stations.

It is a further object of the present invention to provide a continuous loop cassette changer apparatus for transporting a plurality of recording cassettes repeatedly between a dictation station and a transcription station, and control circuitry for coordinating the simultaneous utilization of such dictation and transcription stations.

It is a further object of the present invention to provide a continuous loop cassette changer apparatus for transporting a plurality of recording cassettes between a dictation station and a transcription station, and a priority storage location for storing cassettes having priority units of dictation recorded thereon.

Other objects, features and advantages of the present invention will become apparent upon reading the following detailed description of an embodiment of the invention when taken in conjunction with the accompanying drawing.

BRIEF DESCRIPTION OF THE DRAWING

FIG. 1 is a top plan view of an embodiment of a continuous loop cassette changing apparatus embodying the present invention, with the upper portion of the channel housings broken away to expose interior detail.

FIG. 2 is a pictorial view of the dictation side cassette changer with the upper portion of the channel housing broken away to expose the carriages and drive means.

FIG. 3 is a semi-diagrammatic pictorial view of the channel housing of the dictation side cassette changer, the load mechanism for the dictation record/listen station, and the priority eject mechanism.

FIG. 4 is a vertical cross sectional view taken along line 4—4 of FIG. 1, showing the transcription input transfer mechanism.

FIG. 5 is a vertical cross sectional view taken along line 5—5 of FIG. 1, showing the dictation record/listen station and the load mechanism therefor.

FIG. 6 is a side cross sectional view of the channel housing, showing the follower arm of the eject carriage in an extended position for moving a cassette.

FIG. 7 is a side cross sectional view of the cassette channel showing the follower arm of the eject carriage in a folded position behind a cassette.

FIG. 8 is a rear view of the dictation station load carriage, showing engagement with the drive means.

FIG. 9 is a front view of the priority eject arm mechanism shown in FIGS. 2 and 3, showing the priority output tray in cross section.

FIG. 10 is an elevational view of an embodiment of the invention as shown in FIG. 1.

FIG. 11 is a pictorial view of a mechanism for removing a limit switch contact arm from the path of a cassette carriage trigger.

FIG. 12 is a pictorial view of a cassette carrier of a transfer mechanism as shown in FIG. 4.

FIG. 13 is a pictorial view of a pulley for guiding the belt of a transfer mechanism shown in FIG. 4.

FIG. 14 is a side view of a cassette carrier engaging a pulley.

FIG. 15 is a pictorial view of one of the jaws of the clutch means of a cassette carrier as shown in FIG. 12.

FIG. 16 is an elevational view of the jaw shown in FIG. 15.

FIG. 17 is a partial vertical cross sectional view taken along line 17—17 of FIG. 4.

FIG. 18 is a top view of the cassette carrier release mechanism shown in FIG. 4.

FIG. 19 is a vertical cross sectional view of a belt pulley and associated pulley locator.

DETAILED DESCRIPTION

Figure 20A:
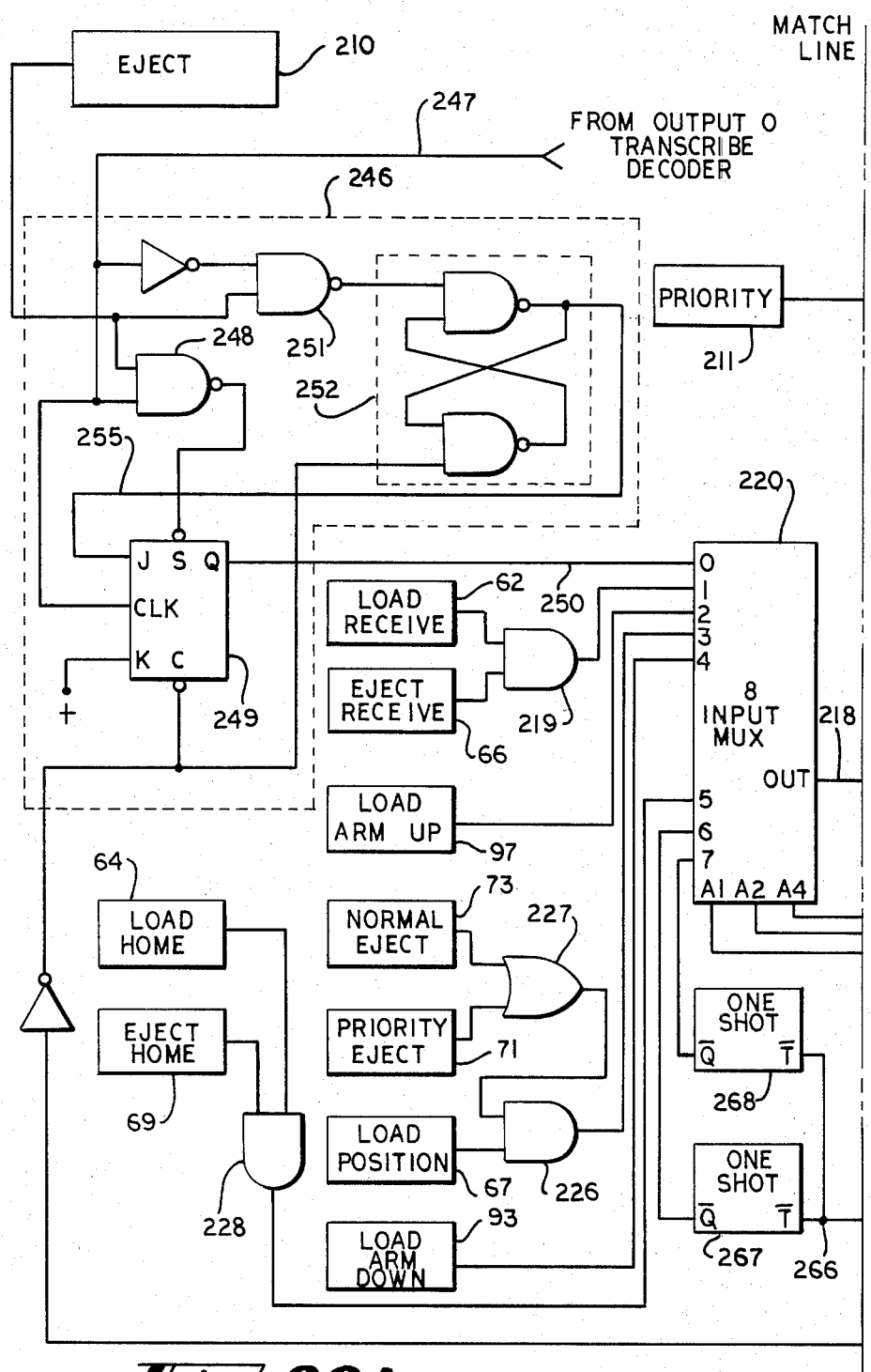
FIG. 20 is a diagrammatic representation of a control circuit for controlling the operation of a cassette changer apparatus embodying the present invention.

Referring now in more detail to the drawing, in which like numerals refer to like parts throughout the several views, FIG. 1 shows a top plan view of an embodiment of a continuous loop changing apparatus 8 according to the present invention, embodied in a dictation/transcription apparatus. The continuous loop cassette changing apparatus 8 includes a dictation side cassette changer designated generally as 9 and a transcription side cassette changer designated generally as 10. The dictation and transcription cassette changers 9 and 10 are similar in design to the cassette changing apparatus disclosed in commonly assigned U.S. patent application Ser. No. 078,232, filed Sept. 24, 1979, the disclosure of which is expressly and fully incorporated herein by reference.

The dictation side cassette changer 9 and the transcription side cassette changer 10 are connected by a dictation input transfer mechanism 18 that extends along one side of the apparatus 8, and by a transcription input transfer mechanism 19 that extends along the opposite side of the apparatus 8. In a manner described in more detail hereinbelow, the cassette transfer mechanisms 18 and 19 transfer cassettes from one cassette changer to the other, in order to accomplish the purpose of the present invention to permit recording of dictation on and transcription of the same cassette repeatedly without manual handling of the cassette. With the exception of a mechanism for ejection of cassettes containing priority units of dictation at a special location, the transcribe side changer apparatus 10 is identical to the dictation side changer apparatus 9, and therefore only the dictation side cassette changer 9 will be described in detail. Similarly, the transcription input transfer mechanism 19 is identical to the dictation input transfer mechanism 18, and therefore only the transcription input transfer mechanism 19 will be described in detail.

The dictation cassette changer apparatus 9, as well as the remaining components of the entire apparatus 8, is supported on a rectangular box-like frame 11 which includes a horizontal top plate with appropriate openings therein as described hereinafter. The dictation changer 9 includes an elongate linear channel housing 12, supported along one edge of the rectangular frame 11, as shown in FIG. 1, a dictation record/listen station 20 located adjacent to the channel housing 12, and a priority eject tray 17 located adjacent to the channel housing 12 between the dictation station 20 and the transcription input transfer mechanism 19. As best seen in FIG. 3, the channel housing 12 defines a cassette channel formed by an upper channel member 24 and a vertically aligned lower channel member 25. The channel housing 12 also defines an upper track member 27 and a vertically aligned lower track member 28 adjacent to the upper and lower cassette channels 24 and 25, respectively. The upper and lower cassette channels and track members are joined by a back wall 30 of the channel housing 12. The channel housing 12 defines a plurality of openings in the front portion thereof, to permit upright cassettes 15 to be shifted into and out of the cassette channel 24, 25. These openings include an input opening 21, a priority eject opening 22, a dictation station load opening 29, and an output opening 31.

Referring to FIGS. 1 and 2, a lead screw or worm gear 32 terminates at either end thereof in axle portions 33 which are rotatably mounted to the back wall 30 of the channel housing 12 by means of bearings 34. The lead screw 32 extends parallel to the cassette channel 24, 25 and the track members 27 and 28, from a point just inside the input opening 21 to a point just inside the output opening 31. The lead screw is rotated in either direction on the axle 33 by means of a reversible DC drive motor 35 mounted to the frame 11, as shown in FIGS. 1, 5 and 10. The motor 35 drives the lead screw 32 by means of a belt 36 connecting a motor pulley 37 to the axle 33, the belt 36 passing through an opening 36a in the back wall 30 of the channel housing, as shown in FIG. 10.

Located within the channel housing 12 is a dictation station load carriage 38, which is mounted for sliding movement along the track members 27 and 28, as shown in FIGS. 1, 2 and 8. The elongate carriage 38 includes three segments, 38a, 38b and 38c, which are separated and carried along the track members 27 and 28 by three vertical supports 40. The supports 40 define slots 39 in the upper and lower ends thereof, the slots 39 matingly receiving the track members 27 and 28 for sliding movement along the track members. The segment 38a of the carriage 38 includes a pinion mounting shaft 53 extending from the rear side of the segment 38a as shown in FIG. 8. The shaft 53 carries a pinion gear 52 that is mounted on the shaft 53 by means of a clutch 54. The pinion gear 52 is located so that it engages the underside of the lead screw 32. Thus, when the lead screw 32 rotates, the pinion gear 52, and thus the carriage 39, travels along the lead screw 32. However, if the carriage 38 encounters resistance to movement while the lead screw 32 is rotating, the clutch 54 allows the pinion gear 52 to rotate about the shaft 53 without jamming the apparatus.

The segment 38b of the carriage 38 is the cassette-engaging portion of the carriage 38. The segment 38b includes a follower arm 42 pivotally mounted on vertically aligned pivot pins 43 located adjacent to the vertical member 40 that separates the segment 38b from the segment 38c. The follower arm 42 is biased by springs 44 associated with the pivot pins 43 to be normally in a position extending at right angles to the segment 38b into the plane of the cassette channel 24, 25. However, the pivot pins 43 allow the follower arm 42 to be folded against the pressure of the springs 44 into a position against the segment 38b.

The segment 38c of the carriage 38 supports a load carriage trigger 46 which extends rigidly to the rear of the carriage 38 above the lead screw 32 in order to engage limit switch contact arms extending through the back wall 30 of the channel housing 12, as will be explained in detail below.

An eject carriage 48 is also slidably positioned for travel along the track members 27 and 28 in a manner similar to the dictation station load carriage 38. The eject carriage 48 includes two segments, 48a and 48b. The segment 48b includes a pinion gear and clutch for engaging the lead screw 38 in a manner identical to that shown in FIG. 8 for the carriage 38 and described hereinabove. A pair of vertical members 40 including slots 39 are located one at each end of the segment 48b. The segment 48a extends parallel to the track members 27 and 28 from the vertical member 40 closest to the transcription input transfer mechanism 19, as shown in FIG. 2. The segment 48a has no other connection to the track members 27 and 28, for reasons that will be apparent from the description below. The segment 48a includes an eject carriage follower arm 49 mounted adjacent to the vertical member 40 in a manner similar to that described above for the dictation station load carriage follower arm 42. The other vertical member 40 on the opposite end of the segment 48b carries an eject carriage trigger 50 which performs a similar function to that of a load carriage trigger 46.

In order to arrest the motion of the carriages 38 and 48 at precise desired positions, stops in the form of limit switch contact arms extend through slots in the back wall 30 of the channel housing 12 in the path of the load carriage trigger 46 and the eject carriage trigger 50. As best shown in FIG. 10, horizontal slots 57, 58, 59 and 60 are cut through the back wall 30 of the channel housing 12 above the lead screw 32. Associated with the slot 57 is a load receive limit switch 62 and an L-shaped contact arm 63 of which one arm extends through the slot 57 into the path of the load carriage trigger 46, and the other arm is pivotally mounted to the back wall 30 adjacent to the limit switch 62. When the dictation station load carriage 38 is moved by the lead screw 32 along the track members 27 and 28 in a direction away from the dictation station 20 until the load carriage trigger 46 engages the contact arm 63, the contact arm 63 pivots to close the limit switch 62 and then by physical contact with the limit switch prevents any further motion of the carriage 38. The carriage 38 is thus stopped by the contact arm 63 at a precise position with the segment 38b of the carriage 38 directly opposite the input opening 21 in the channel 24, 25. It should be noted that the carriage 38 must be of sufficient length so that when the trigger 46 engages the contact arm 63, the pinion gear 52 is still engaged with the lead screw 32. FIG. 8 shows the position of the dictation station load carriage 38 when it is engaging the contact arm 63 and is in a position ready to receive a cassette from the dictation input transfer mechanism 18. When closed, the load receive limit switch 62 provides an electrical signal to a control circuit, described below, indicating the position of the load carriage 38.

The elongate slot 58 is located between the input opening 21 and the dictation station load opening 29. An L-shaped contact arm 68 extends through the slot 58 at the end of the slot 58 nearest to the dictation station load opening 29. The contact arm 68 is pivotally mounted to the back wall 30 of the channel housing 12 between two limit switches, an eject receive limit switch 66 and a load position limit switch 67, that are also mounted to the back wall 30. When the dictation station load carriage 38 is moved by the lead screw 32 in a direction away from the input opening 21 to a position opposite the dictation station load opening 29, the load carriage trigger 46 engages the contact arm 68, causing the contact arm 68 to close the load position limit switch 67 and arrest the motion of the carriage 38. When closed, the limit switch 67 provides an electrical signal which indicates the position of the carriage 38. When the eject carriage 48 is moved by the lead screw 32 in a direction away from the output opening 31 until the eject carriage trigger 50 engages the contact arm 68, the contact arm 68 is pivoted to close the eject receive limit switch 66 and the contact arm 68 arrests motion of the eject carriage 48 at a pecise position opposite the dictation station load opening 29. When closed, the limit switch 66 provides an electrical signal indicating the position of the eject carriage 48.

Also associated with the slot 58, at the end thereof nearest to the input opening 21, is an L-shaped contact arm 65. The contact arm 65 differs from the contact arms 63 and 68 in that it can be removed from the path of the triggers 46 and 50. As shown in FIG. 11, the contact arm 65 is pivotally mounted to a plunger 120 of a solenoid 121. The solenoid 121 is mounted to the back wall 30 by a bracket 122, and is connected by leads (not shown) to the control circuit. When the plunger 120 is extended from the solenoid 121, the contact arm 65 extends through the slot 58 into the path of the load carriage trigger 46. When the load carriage 38 is moved by the lead screw 32 in a direction away from the dictation station 20 until the trigger 46 engages the extended contact arm 65, the contact arm 65 closes a load home limit switch 64 and arrests motion of the carriage 38 in a position that is designated herein as the "home" position of the load carriage 38. When the limit switch 64 is closed, an electrical signal is provided to the control circuit indicating the position of the carriage 38.

The slot 59 in the back wall 30 of the channel housing 12 is located between the dictation station load opening 29 and the priority eject opening 22. A removable contact arm 70 is located near the end of the slot 59 nearest to the opening 29, and is associated with a solenoid 123 for withdrawing the contact arm 70 from the slot 59 when desired. When the contact arm 70 is extended into the slot 59, engagement of the contact arm 70 by the eject carriage trigger 50, moving in a direction away from the output opening 31, closes an eject home limit switch 69 and arrests motion of the eject carriage 48 at a position that is designated herein as the "home" position of the eject carriage 48. At the opposite end of the slot 59, a removable contact arm 72 is associated with a solenoid 124 for selectively withdrawing the contact arm 72 from the slot 59. When the contact arm 72 is extended into the slot 59 and is engaged by the eject carriage trigger 50, moving in a direction away from the dictation station 20, the contact arm 72 closes a priority eject limit switch 71 and arrests the motion of the eject carriage 48 at a precise position opposite the priority eject opening 22. The solenoids 123 and 124 operate in an identical manner to the solenoid 121 as described above. When closed, the limit switches 69 and 71 provide electrical signals to the control circuit indicating the appropriate position of the eject carriage 48.

The slot 60 in the back wall 30 is located between the priority eject opening 22 and the output opening 31. A non-removable contact arm 74 extends through the slot 60 and is pivotally mounted to the back wall 30 adjacent to a normal eject limit switch 73. When the eject carriage 48, moving in a direction away from the dictation station 20, reaches a position opposite the output opening 31, the eject carriage trigger 50 engages the contact arm 74, closing the limit switch 73 and arresting motion of the eject carriage 48 at a precise position opposite the opening 31. When closed, the limit switch 73 provides an electrical signal to the control circuit indicating the position of the eject carriage 48.

Referring now primarily to FIGS. 1, 3 and 5, when the dictation station load carriage 38 is driven by the lead screw 32 from a position opposite the input opening 21 to a position opposite the dictation station load opening 29, a cassette 15 that is being urged along the channel 24, 25 by the load carriage follower arm 42 enters a removable section 77 of the channel 24, 25. When the load carriage trigger 46 engages the contact arm 68 and is stopped thereby, the cassette 15 is centered within the removable channel section 77. The removable channel section 77 is attached to a dictation station load arm 76 that is pivotally mounted to a pivot axle 80 located below the channel 24, 25. The axle 80 is supported by brackets 79 attached to the frame 11.

Also supported by the frame 11 is a dictation station 20 located opposite the dictation station load opening 29, and comprising a tape transport mechanism including a pair of spindles 94 and a capstan 95, and a movable record/listen head assembly 96 that also includes a pinch roller (not shown) for engaging the capstan 95. The load arm 76 is movable to load a cassette 15 located therein onto the dictation station 20 by pivoting the removable channel section 77 until it lays a cassette therein against the dictation station 20. An opening 78 formed between the channel section 77 and sides of the load arm 76 permits the spindles 94 and capstan 95 to enter conventional openings in the cassette. Once a cassette is loaded onto the dictation station 20, the tape transport mechanism and record/listen head can be operated in a conventional manner by dictation controls (not shown). When the channel section is in the unload position shown in FIG. 5, the channel section 77 forms an integral part of the channel 24, 25.

The means for moving the channel section between the load and unload positions described above and includes a load arm drive shaft 83 that can be selectively rotated by a reversible DC motor 84 that is connected to the drive shaft 83 by bevel gears 85 and 86, as shown in FIG. 3. Fixed to the shaft 83 near the load arm 76 is a drive cam 89 including an axially extending cam arm 90. A leaf spring 92 bent in the shape of a "V" is rigidly fixed to the pivot axle 80 at the point of the "V". The arms of the "V" extend on either side of the shaft 83 and on either side of the cam arm 90. When the shaft 83 is rotated counterclockwise in FIG. 3, the cam arm 90 lifts the upper branch of the leaf spring and thereby rotates the axle 80 and pivots the load arm 76 away from the channel housing 12 and into engagement with the dictation station 20. When the shaft 83 is rotated in the opposite direction, the cam arm 90 moves the lower branch of the leaf spring and thereby pivots the load arm 76 so that the channel section 77 is replaced back into engagement with the channel housing 12. The leaf spring 92 thus provides a "soft" drive for the load arm 76 in that the shaft 83 and cam 90 may continue to travel when the pivot arm 76 and channel section 77 have engaged either the transport mechanism 20, the channel housing 12 or an obstruction to proper engagement, without jamming the apparatus.

In order to provide signals to the control circuit indicating the position of the load arm 76, a load arm down limit switch 93 is mounted on the dictation station 20, as shown in FIG. 5, and a load arm up limit switch 97 is mounted atop the channel housing 12 having a contact arm 98 extending in the direction of the opening 29, as shown in FIG. 3. The limit switch 93 is closed by the load arm 76 itself, and the limit switch 97 is closed by a trigger block 99 mounted atop the channel section 77 so as to engage the contact arm 98 when the load arm 76 is pivoted into engagement with the channel housing 12.

Associated with the priority eject opening 22 is a priority eject slide 100, shown in FIGS. 1, 2, 3 and 9. The eject slide 100 is normally positioned vertically along the inner edge of the channel 24, 25 so that cassettes being urged along the channel 24, 25 by the eject carriage 48 can pass by the eject slide 100. The slide 100 includes a horizontally projecting tongue 101 which extends forwardly within an opening 104 in the bottom of the channel section 25, replacing the portion of the bottom of the lower channel member 25 removed by the opening 104. Extending from the eject opening 22 is a priority eject tray 17 defining a continuation of the opening 104 in the bottom thereof. The priority eject tray 17, as shown in FIG. 9, is formed by a pair of L-shaped side wall members 106 fixed to the top of the frame 11. The side wall members 106 are shaped so as to form a pair of slots 107 between the side wall members 106 and the frame 11 along the sides of the opening 104. The tongue 101 is fixed to a flat, horizontal slot engaging member 102 that is slidably received within the slots 107 for sliding movement along the priority eject tray 17. Attached to the slot engaging member 102 and extending therefrom downwardly to a point below the frame 11 is a drive tab 103.

Attached to the drive shaft 83 below the slot engaging member 102 is an eject slide delivery arm 116 which is rotated by the shaft 83 in an arc which is intercepted by the drive tab 103 each time the drive shaft 83 rotates the load arm 76 to load the dictation station 20. The engagement of the eject slide delivery arm 116 with the tab 103 slides the member 102 along the slot 107 away from the channel housing 12, and thereby draws the eject slide 100 through the plane of the channel 24, 25. It will be seen that a cassette positioned at the eject opening 22 will be moved by the movement of the eject slide 100 out of the channel 24, 25 and into the priorty eject tray 17. Since the segment 48a of the eject carriage 48 extends behind the channel 24, 25, the presence of the eject carriage 48 opposite the eject opening 22 does not interfere with the operation of the eject slide 100. A pair of spring clips 109 located on each side wall member 106 near the entrance to the priority eject tray 17 retain within the tray 17 a cassette that is moved into the tray 17 by the eject slide 100.

In order to return the eject slide 100 to its normal position, an eject slide return arm 112 is mounted on a vertical shaft 113 and biased by a coil spring 114 to urge the drive tab 103 back toward the channel housing 12. Since the delivery arm 116 operates against the biasing action of the return arm 112, when the delivery arm 116 is rotated away from the drive tab 103 by the shaft 83 (at the same time as the load arm 76 is rotated to place the channel member 77 back into engagement with the channel housing 12) the return arm 112 slides the slot engaging member 102 back toward the channel housing 12 until the eject slide 100 reaches its normal position aligned with the inner edge of the cassette chanel 24, 25.

To reduce the overall cost of the system, it is preferred that no priority eject tray and associated apparatus be provided in the transcribe side changer apparatus 10. In all other respects, the transcribe side changer apparatus 10 can be identical to the dictation side changer apparatus 9 just described, and the corresponding parts are labelled by the addition of the letter "t" to the appropriate reference numeral.

The transcription input transfer mechanism 19 is shown in detail in FIGS. 4 and 12-19. As noted above, the dictation input transfer mechanism 18 is of similar construction, and therefore will not be separately described herein. The transcription input transfer mechanism 19 includes a transcription input transfer tray 16 that is similar in construction to the priority eject transfer tray 17, described above. However, the input transfer tray 16 extends to connect the transcription input opening 21t in the transcription channel housing 12t to the dictation output opening 31 in the dictation channel housing 12. The tray 16 comprises a pair of L-shaped side wall members 106 resting on the top of the frame 11, and shaped to define slots 107 between the side wall members 106 and the frame 11 at the edge of an opening 152 in the top of the frame 11. The opening 152 also passes through the bottom portion of each of the opposite channel housings 12 and 12t and communicates with a pair of openings 153 in the back walls 30 and 30t as shown in FIG. 4. Each of the openings 153 also extends downwardly below the channel housings to form the shape of a "T", as shown in FIG. 10.

A continuous transfer belt 125, having a rectangular cross section, is mounted directly beneath the opening 152. The transfer belt 125 is carried in a peripheral groove 126 of each of a pair of pulleys 127 that are rotatably mounted on axles 128 to the opposite exterior walls of the frame 11 by means of brackets 129.

A pictorial view of the pulleys 127 is shown in FIG. 13. In addition to the peripheral groove 126, the pulleys 127 include a plurality of radial cutouts 130 and a plurality of shallow depressions 131 in the side thereof, for purposes to be described below. A DC motor 132, mounted to the frame 11 by a bracket 133, is drivingly connected to the axle 128 of one of the pulleys 127, as shown in FIGS. 1 and 10. A pulley locator 170 is mounted on the bracket 129 opposite the motor 132 and adjacent to the driven pulley 127, as shown in FIG. 10. The pulley locator 170 (best shown in FIG. 19) includes a ball 171 at its protruding tip, and a spring 172 within a cavity behind the ball 171 urging the ball 171 outwardly. The locator 170 is positioned so that the ball 171 enters the depressions 131 in the side of the driven pulley 127 successively as the pulley rotates. The purpose of the locator 170 and depressions 131 is to assure that the pulley will be positively oriented each time the motor 132 is stopped by causing the pulleys to continue to move until the ball 171 is seated in the bottom of one of the depressions 131. By carefully selecting the distance between the carrier release arm 160 and the driven pulley 127, and the distance between the front of the transcribe side channel housing 12t and the idling pulley 127, it can be assured that the cassette carriers 135 will always properly engage the cutouts 130 in both of the pulleys 127 when the motor 132 is started.

A plurality of cassette carriers 135 are mounted on the belt 125 for movement therewith. As shown in FIG. 12, each cassette carrier 135 includes a paddle-like cassette engaging member 136 extending above a housing 140. The housing 140 is hollow and defines a pair of aligned openings 141 for receiving the belt 125. Within the housing 140 are pivotally mounted a pair of jaws, an upper jaw 144 and a lower jaw 145. The jaws 144 and 145 are mounted to the housing 140 by means of pivot pins 143 that extend at right angles to the length of the belt 125. As shown in FIGS. 15 and 16, each of the jaws include a plurality of teeth 146 for engaging the belt 125, and are biased to pivot in a direction opposite to the direction of travel of the belt 125 by a spring 148 that is attached to the jaw and to the pivot pin 143. The jaws are mounted within the housing on either side of the belt 125 at a distance from one another so as to form a clutch means between the cassette carrier 135 and the belt 125. It will be seen that the pressure of the springs 143 causes the jaws to bite into the belt 125 and to be carried along therewith so long as no obstruction to the movement of the cassette carrier 135 is encountered. However, if movement of the cassette carrier 135 is physically restrained, the movement of the belt 125 about the pulleys 127 caused by the motor 132 will overcome the force of the springs 148, and therefore the belt 125 will continue to move and will pass between the jaws 144 and 145 and through the openings 141 of the cassette carrier 135 even though motion of the cassette carrier 135 has been arrested. The cassette carrier 135 also includes a pair of guide rods 150 extending therefrom between the cassette-engaging member 136 and the housing 140. The guide rods 150 are positioned and shaped so as to be received by the slots 107 defined between the side wall members 106 of the tray 16 and the frame 11, as shown in FIG. 17.

The bottom portion 142 of the housing 140 is shaped to be matingly received by the cutouts 130 of the pulleys 127. Thus, as shown in FIG. 14, the cassette carriers 135 can encircle the pulleys 127 with the belt 125 by being carried around the pulleys 127 in the cutouts 130. The cassette carriers 135 are mounted on the belt 125 so that the cassette-engaging member 136 extends upwardly as the belt passes closely under the opening 152 travelling from the dictation output opening 31 toward the description input opening 21t. As a cassette carrier 135 moves around the driven pulley 127 and approaches the back wall 30 of the dictation channel housing 12, two pairs of curved guides 155 and 156 assure that the guide rods 150 will pass into the slots 107. The positioning of the guide rods 150 within the slots 107 assures that the cassette-engaging member 136 will be properly oriented as it passes along the tray 16. It will thus be seen that when a cassette 15 is positioned at the dictation output opening 31, a cassette carrier 135 passing through the opening 153 will push the cassette 15 out of the cassette channel housing 12 and into the transcription input transfer tray 16, and continue to push the cassette 15 along the tray 16. An elongate spring clip 157 is mounted to each of the side wall members 106 to prevent the cassette 15 from falling over as it is pushed along the tray 16. Upon reaching the transcription cassette channel housing 12t, the cassette pushed by the carrier 135 will enter the channel 24t, 25t at the opening 21t, and motion of the carrier 135 and cassette will be stopped by physical pressure against the channel 24t, 25t. This causes jaws 144 and 145 of the carrier 135 to release from the belt 125 which continues to move. When the transcription changer apparatus 10 removes the cassette from the opening 21t, there is nothing blocking the movement of the carrier 135, which therefore reengages the belt 125 and moves with the belt through the channel housing 12t and around the pulley 127.

When the cassette carriers 135 are traveling with the portion of the belt that is below the pulleys 127 and is moving in a direction away from the transcription channel housing 12t and toward the dictation channel housing 12, the cassette carriers 135 are oriented with the cassette-engaging members 36 extending downwardly. A cassette carrier release arm 160 is pivotally mounted to the frame 11 by supports (not shown) and can be selectively lowered into the path of the cassette carriers 135 in order to retain the cassette carriers 135 until one cassette carrier is required to remove a cassette from the dictation channel 12 and to move the cassette along the transcription input tray 16 for eventual transcribing of dictation recorded thereon. It will be seen in FIGS. 4 and 18 that the carrier release arm 160 is forked shaped and straddles the belt 125 to effectively stop motion of the cassette carriers 135 so that the belt 125 will continue to move through the carriers 135 by overcoming the tension on the jaws within the carriers 135. The carrier release arm 160 curves upwardly from the forked portion which engages the cassette carriers 135 to a pivot axle 161 which pivotally connects the arm 160 to the frame 11. The arm 160 then curves downwardly a short distance to a pivotal connection 165 between the arm 160 and a plunger 166 of a solenoid 167. The carrier release arm 160 thus can be pivoted out of the path of the cassette carriers 135 by extension of the solenoid plunger. At such a time, the clutch-like jaws 144 and 145 of the cassette carriers 135 would again bite into the belt 125 and be carried along therewith.

Mechanical Operation

Turning now to the mechanical operation of the continuous loop cassette changer apparatus 8, a cassette change cycle for the dictation cassette changer apparatus 9 begins when a dictating person initiates the replacement of a cassette mounted on the dictation station 20 by activating an eject control 210 (shown diagrammatically in FIG. 20A). Prior to initiation of the change cycle, the load carriage 38 is in its home position resting against the contact arm 65, and the eject carriage 48 is in its home position resting against the contact arm 70, as shown in FIG. 1. Thus, the plungers 120 of the load home solenoid 121 and the eject home solenoid 123 are extended. The priority eject solenoid 124 is in a retracted position with the contact arm 72 removed from the channel housing 12. The load drive shaft 83 is in a position wherein the load arm 76 and removable channel section 77 have been rotated down onto the dictation station 20, and the control circuit has enable conventional dictate controls (not shown) for the recording and review of dictation on a cassette within the channel section 77. The rotation of the load drive shaft 83 has also caused the priority eject slide delivery arm 116 to slide the priority eject slide 100 across the cassette channel 24, 25 and into the priority eject tray 17. All of the DC motors 35, 84 and 132 are stopped. A cassette 15 has been urged into the cassette channel 24, 25 through the dictation input opening 21 by one of the cassette carriers 135 in a manner similar to that shown in FIG. 4. One or more additional cassettes may be located directly adjacent to the input opening 21. Such cassettes are separated by cassette carriers 135 which have moved the individual cassettes along the dictation input transfer tray 14 from the transcription cassette channel 24t, 25t. The cassette carriers 135 and associated cassettes 15 adjacent the channel housing 12 press against the channel housing 12 and against each other, and therefore the belt 125 passes through the openings 141 in the cassette carriers 135.

Upon activation of the eject control 210 by a dictating person, the control circuit causes the contact arms 65 and 70 to be withdrawn from the channel housing 12, and operates the motor 35 which causes the lead screw 32 to rotate so as to move the load carriage 38 and the eject carriage 48 from their home positions toward the dictation input opening 21 and the dictation station load opening 29, respectively. When the section 38b of the load carriage 38 reaches a position opposite to the input opening 21, the load carriage trigger 46 will engage the contact arm 63, stopping the load carriage 38 and closing the load receive limit switch 62. It should be noted that as the lead screw 32 causes the load carriage 38 to cross the input opening 21, the follower arm 42 engages the cassette 15 located in the channel 24, 25, causing the follower arm 42 to be folded against the carriage 38 until the follower arm 42 emerges from behind the cassette 15 and resumes its position perpendicular to the cassette channel 24, 25. When the eject carriage 48 reaches a position opposite the opening 29, the eject carriage trigger 50 will engage the contact arm 68, stopping the load carriage and closing the eject receive limit switch 66. It should be noted that the carriages 38 and 48 do not have to reach their stopping points simultaneously, because if one arrives earlier than the other, the clutch 54 will allow the lead screw 32 to continue to freely rotate until both carriages have been stopped.

When the control circuit receives signals from the limit switches 62 and 66 indicating proper positioning of the carriages 38 and 48, the control circuit operates the motor 84 to rotate the shaft 83, causing the drive cam 89 and associated cam arm 90 to lower the leaf spring 92 and thereby swing the load arm 76 away from the dictation station 20 and toward the channel housing 12, until the channel section 77 is aligned with the cassette channel 24, 25 and the trigger block 99 closes the load arm up limit switch 97. Simultaneously, the priority eject slide delivery arm 116 has been removed from the path of the drive tab 103, allowing the return arm 112 to slide the priority eject slide 100 back across the cassette channel 24, 25 to its normal position aligned with the inner edge of the channel 24, 25.

When the control circuit receives a signal indicating closing of the limit switch 97, operation of the motor 84 is stopped, and the motor 35 is caused to rotate in an opposite direction to move the carriages 38 and 48 to the right in FIGS. 1 and 2. When the lead screw 32 is rotated to bring the load carriage 38 back in the opposite direction, the follower arm 42 engages the end of the cassette 15 in the cassette channel 24, 25 and urges the cassette along the cassette channel in the direction of the dictation station 20. Similarly, the follower arm 49 of the eject carriage 48 has engaged the end of a cassette 15 within the channel section 77 and urged such cassette out of the channel section 77 and along the cassette channel 24, 25 toward the output opening 31. Since the contact arms 65 and 70 have been removed from the channel housing 12, the load carriage 38 proceeds until the load carriage trigger 46 engages the contact arm 68, closing the load position limit switch 67. The eject carriage 48 proceeds until the eject carriage trigger engages the contact arm 74, closing the normal eject limit switch 73. It will be apparent from FIG. 1 that the load carriage 38 will be stopped some time before the eject carriage 48, but the clutch 54 of the load carriage 38 permits the lead screw to continue to freely rotate until the eject carriage 48 is stopped. At this point, the segment 38b of the load carriage 38 is located directly opposite the dictation station load opening 29, and the cassette moved thereby is centered within the removable channel section 77. The cassette moved by the eject carriage 48 is in a position opposite the output opening 31 which opens into the transcription input tray 16. Such cassette is held in an upright position by a leaf spring 41 fixed within the upper channel member 24. As the eject carriage 48 reaches the output opening 31, the cassette slides under the leaf spring 41.

When both limit switches 67 and 73 are closed, the control circuit causes the motor 84 to operate to once again swing the load arm 76 to remove the channel section 77 and the cassette newly placed therein from the channel housing 12 down onto the dictation station 20, closing the load arm down limit switch 93. At the same time, the load home solenoid 121 and eject home solenoid 123 are caused to extend the contact arms 65 and 70 back into the channel housing 12.

When the load arm down limit switch is closed, the motion of the motor 84 is stopped, and the motor 35 is operated to rotate the lead screw 32 to return the load carriage 38 and the eject carriage 48 to their home positions against the contact arms 65 and 70, respectively.

When the load home limit switch 64 and the eject home limit switch 69 are both closed, the motor 35 is stopped and the operation of the transcription input transfer mechanism 19 is begun to remove from the channel 24, 25 the cassette left by the eject carriage 48 in the channel 24, 25 at the output opening 31. To accomplish this, the carrier release solenoid 167 is operated for a predetermined period of time to extend the plunger 166, pivoting the carrier release arm 160 out of the path of the cassette carriers 135 that are being retained along the lower path of the belt 125 of the transcription input transfer mechanism 19, shown in FIG. 4. The carrier release arm 160 is raised only long enough to allow a single cassette carrier 135 to be carried away by the belt 125, the carrier release arm 160 being lowered to catch and retain the remaining cassette carriers 135 that may be queued up behind the release arm 160 at any given time. At the same time, the transfer belt motor 132 is operated to rotate one of the pulleys 127 so as to cause the transfer belt 125 to circulate around the pulleys 127.

The cassette carrier 135 that has been released by the carrier release arm 160 will be carried with the belt 125 until it engages one of the cutouts 130 in the pulley 127 and is carried around the pulley 127. The cassette carrier 135 is now in an upright orientation, and moves with the belt 125 through the opening 153 in the back wall 30 of the channel housing 12, engaging the cassette that is located adjacent to the output opening 31, and pushing such cassette out of the channel 24, 25 into the transcription input tray 16. The elongate spring clips 157 along either side of the tray 16 prevents the cassette 15 from falling over as it is pushed along the tray by the cassette carrier 135. As the cassette and cassette carrier approach the transcription channel housing 12t, typically the cassette carrier 135 will engage and be stopped by another cassette carrier already positioned adjacent to the channel housing 12t. In this case, the newly added cassette carrier 135 and cassette 15 will advance toward the cassette channel housing 12t each time a cassette is transferred to the transcription listen station 20t.

To assure that a cassette 15 is always present in the channel 24t, 25t, the belt motor 132 is also operated for a short time whenever the transcription side changer apparatus 10 is operated, in order to move the next cassette adjacent to the channel housing 12t into the channel 24t, 25t through the transcription input opening 21t. Eventually, the newly added cassette carrier 135 will move its cassette 15 through the transcribe input opening 21t so that the cassette bears against the inner edge of the channel 24t, 25t. When such cassette is moved along the channel away from the input opening 21t, the associated cassette carrier 135 will automatically bite into the transfer belt 125 the next time the belt motor 132 is operated, and will be carried through the channel housing 12t, out through the opening 153, around the pulley 127, and into engagement with other cassette carriers 135 retained by the carrier release arm 160.

The control circuit shuts off the motor 132 after a predetermined period of time calculated to be sufficient to permit a cassette carrier 135 to be moved by the belt 125 from the release arm 160 to the transcription channel housing 12t. When the motor 132 is shut off the pulley locator 170 will cause the pulleys 127 to cease rotation in the proper orientation for receiving cassette carriers 135 the next time the motor 132 is operated.

Fresh cassettes are supplied to the dictation channel 24, 25 through the dictation input opening 21 in the same manner by the dictation cassette changer 9 and the dictation input transfer mechanism 18, which removes such cassettes from the transcription channel housing 12t through the output opening 31t. The cassette changers 9 and 10 transfer mechanisms 18 and 19 are prevented from operating simultaneously, in a manner described below, to avoid the possibility of a cassette carriage 135 striking a carrier 38 or 48.

If the dictating person dictates a priority unit of dictation, the cassette containing such priority dictation can be ejected into the priority output tray 17 and manually retrieved for immediate transcription. A priority eject control 211 (shown diagrammatically in FIG. 20) is operated before operation of the eject control 200, and in response the control circuit causes the priority solenoid 124 to insert the contact arm 72 into the channel housing 12 in the path of the eject carriage trigger 50. Therefore, when the lead screw moves the eject carriage 48 and a cassette carried thereby away from the dictation station 20, the carriage 48 will be stopped opposite the priority eject opening 22 rather than the output opening 31. When the motor 84 operates to rotate the shaft 83, the eject slide 100 pushes the cassette into the priority eject tray 17. When the load arm down limit switch 93 is closed as described above, the control circuit causes the solenoid 124 to withdraw the contact arm 72 from the path of the trigger 50, since the eject carriage 48 will soon thereafter be moved back to its home position against contact arm 70.

It will be noted that throughout the operation of the changer apparatus 8, the cassettes 15 are continuously positively oriented in an upright position.

Controller Operation

Figure 20B:
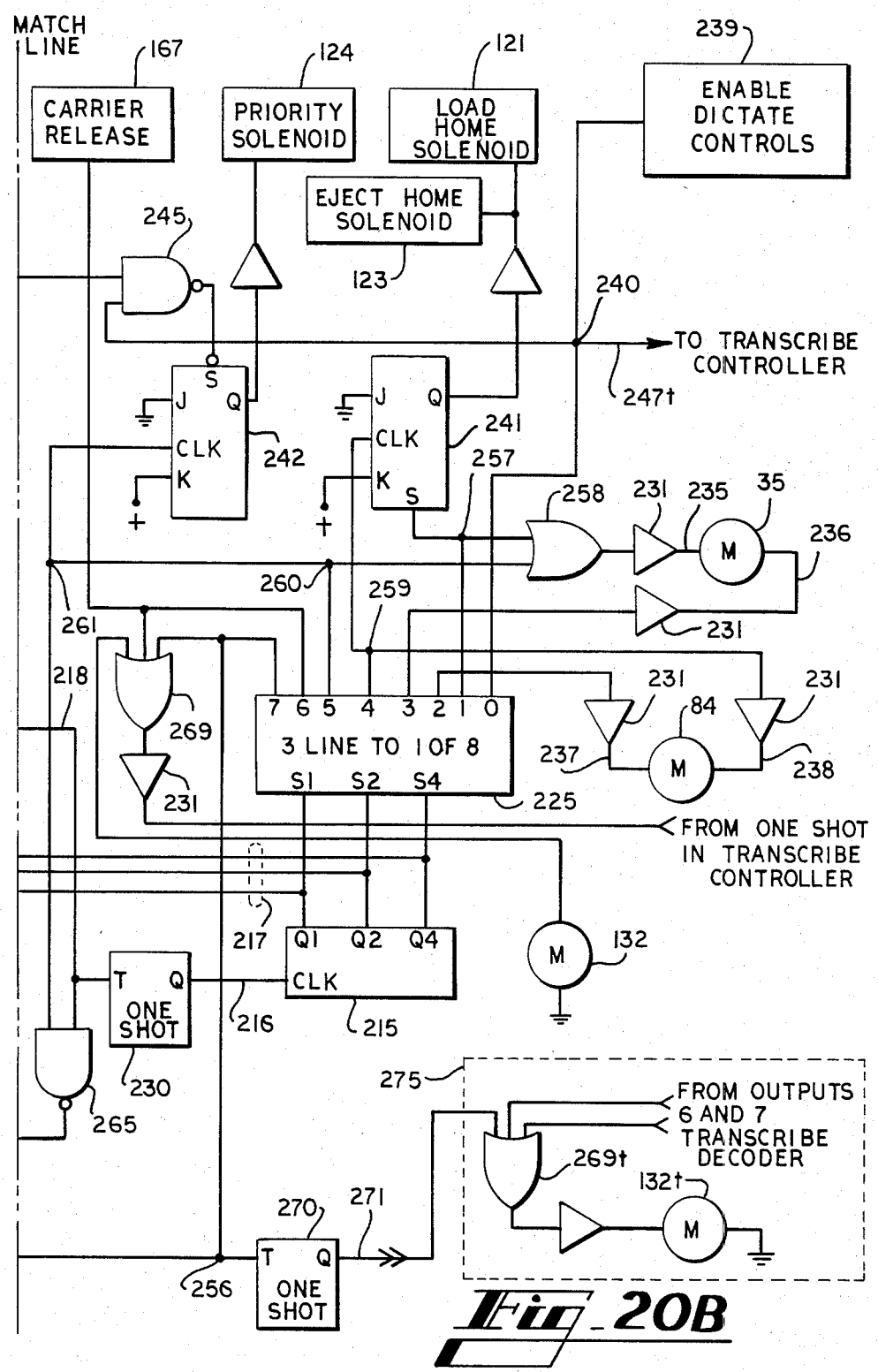

A control circuit or controller for the preferred embodiment of the present invention is shown in FIG. 20. It is to be understood that the circuitry shown in FIG. 20 is that for controlling the dictation side changer. It will be appreciated that the controller for the transcribe side is in all ways symmetrical except for the absence of any inputs relating to a priority eject tray. Several outputs from the controller for the transcribe side (not completely shown) are necessary as inputs to the dictation side controller and are shown in FIG. 20. The corresponding outputs from the controller of FIG. 20 which are provided to the transcribe controller are also shown on FIG. 20.

The controller of the present invention is essentially a state machine controlled by a state counter 215. It will be appreciated by those skilled in the art that state counter 215 is a scale of eight counter counting binary 000 through 111 (1–7) in response to positive going transitions at clock input 216. The construction of a scale of eight counter from a plurality of flip-flops or a conventional integrated circuit four bit binary counter will be obvious to those of ordinary skill in the art and is not described in detail herein.

The outputs of state counter 215 are provided as state outputs 217 which control the address inputs of an eight input multiplexer 220 and the inputs to a three line to one of eight decoder 225. It will therefore be appreciated that for any particular state of state counter 215, one and only one of the outputs of decoder 225 will be a logical one with the remaining outputs being logical zero. Also one and only one of the inputs to multiplexer 220 will be connected to the output appearing on line 218.

It will be apparent from inspection of FIG. 20 that the inputs to multiplexer 220 are the outputs of limit switches 62, 64, 66, 67, 69, 71, 73, 93, and 97 or a logical combination thereof. Specifically the one input to multiplexer 220 goes high only when both limit switches 62 and 66 are activated because of the presence of AND gate 219.

Similarly the three input to multiplexer 220 is controlled by AND gate 226 and OR gate 227 so that said input goes high only when load position limit switch 67 is closed and either of the eject limit switches 71 or 73 is closed. AND gate 228 assures that the five inputs to multiplexer 220 will go high only when both home position limit switches 64 and 69 are activated.

As may be seen from FIG. 20, a one shot 230 will be triggered upon positive going transitions on line 218 from the output of multiplexer 220. The negated output of one shot 230 is provided on line 216 to the clock input of state counter 215. Therefore at the end of the pulse period of one shot 230 (selected to be short) state counter 215 will count to its next state. It will therefore be appreciated that when the particular input to multiplexer 220 which is selected by state lines 217 makes a zero to one transition which appears on line 218, state counter 215 will count to its next state when one shot 230 times out.

The decoded state outputs of three line to one of eight decoder 225 controls motors 35, 84 and 132 as described hereinabove. It is to be understood that motors 35, 84, and 132 are DC motors which will rotate in a direction determined by the polarity of the voltages present on their two line inputs. Note that a plurality of buffer amplifiers 231 are provided to the inputs to motors 35, 84 and 132 in order to provide sufficient power to drive these motors. It is to be understood that motor 35 rotates lead screw 2 in a direction corresponding to movement of carriages 38 and 48 toward their home and receive positions from their dictation station and output positions, respectively, when line 235 is positive with respect to line 236. Therefore motor 35 rotates lead screw 32 in the opposite direction driving the carriages toward their eject positions when line 236 is positive with respect to line 235.

Similarly motor 84 rotates in a direction which raises load arm 76 toward channel member 12 when line 237 is positive with respect to line 238 and lowers load arm 76 when line 238 is positive with respect to line 237.

As will be appreciated from the description below, whenever state counter 215 is in its zero state providing a logical one to point 240, the dictation side of the apparatus is in condition for normal operation of the apparatus as a dictation recorder. The logical one is provided to a conventional enable input for block 239. It will be appreciated by those skilled in the art that the logical one present at point 240 is used to enable the dictation station record/playback electronics (not shown) in a conventional manner when state counter 215 is in its zero state and will disable the dictate controls when counter 215 is in a state other than zero, indicating that the change operation is in progress.

A pair of flip-flops 241 and 242 are arranged as latches to control solenoids 121, 123 and 124, respectively. A logical one at point 240 also enables NAND gate 245 to be responsive to priority switch 211. Therefore at any time during the dictation of a particular cassette engaged with dictation station 20 prior to operation of eject switch 210, the dictator may operate priority switch 211 which will directly set flip-flop 242, the output of which activates priority solenoid 124, which inserts contact arm 72 into the housing 12.

It will be appreciated from inspection of FIG. 20 that flip-flop 241 is directly set when state counter 215 enters its one state and will be cleared upon entry of state counter 215 into its fourth state. From the state description to follow, it will be apparent that activation of load home solenoid 121 and eject home solenoid 123 as described hereinabove is appropriate during states 1, 2 and 3 of counter 215.

The controllers of the preferred embodiment are designed to assure that only one side of the changing apparatus will be engaged in a change cycle at any one time. It is the function of the lock out circuitry shown in block 246 to prevent the dictation side changer from entering into a change cycle while a change cycle is proceeding on the transcribe side. It will be appreciated that similar circuitry is also provided in the transcribe controller in order to prevent initiation of a change cycle on the transcription side while a change cycle is in progress on the dictation side.

However, in the environment of the present invention there is no assurance that the dictator will be aware of a change cycle in progress on the transcribe side and therefore the lock out circuitry 246 will store the occurrence of an eject signal from eject switch 210 which occurs during a change cycle on the transcription side and will initiate the change cycle on the dictation side when the transcription side change cycle is completed.

Note that an input to lock out circuitry 246 is provided on line 247 from the zero output of the transcribe decoder corresponding to decoder 225 of FIG. 20. It will therefore be appreciated that line 247 will be in its logical one condition when the transcribe controller is in its zero state indicating that no change cycle is in progress. A logical zero on line 247 indicates that a change cycle is in progress on the transcription side of the preferred embodiment and that any eject signal from switch 210 should be stored.

Note that if a one is present on line 247 (indicating that a dictation side eject cycle may begin) a logical one from eject switch 210 will cause both inputs to NAND gate 248 to be one thus directly setting flip-flop 249 and causing a logical one to appear on line 250 thus initiating a dictation side change cycle.

If eject switch 210 is operated when a logical zero is present on line 247, NAND gate 251 will provide a logical zero input to NAND gate latch 252 causing a logical one to appear on line 255 which is provided to the J input of flip-flop 249. Flip-flop 249 will be responsive to its J and K inputs upon the occurrence of positive transitions on line 247. Therefore if NAND gate latch 252 is set by eject switch 210 when a change cycle is proceeding on the transcription side, the reentry of the transcribe controller (not shown) into its zero state (indicating completion of the cycle) will clock flip-flop 249 thus setting the flip-flop and providing a logical one on line 250 initiating the change cycle on the dictation side. Note that flip-flop 249 is cleared by the presence of a logical one at point 256 from the seven output of decoder 225 and thus flip-flop 249 will cleared upon entry into the last state of a dictation side change cycle.

It will be appreciated that a duplicate of lock out circuitry 246 is also present on the transcription side controller to prevent transcription change cycles from beginning while a dictation side change cycle is in progress.

From the foregoing mechanical description and description of the controller of FIG. 20 it will be apparent to those skilled in the art that the controller of FIG. 20 will control the dictation side changer through a change cycle according to the following state sequence.

During the zero or ready state of counter 215, a logical one is provided to point 240 enabling dictate controls 239. Entry into the one state is provided by a zero to one transition on line 250 which is passed through to line 218 triggering one shot 230. The timing out of one shot 230 clocks counter 215 along line 216. When the one state is entered a logical one is provided at point 257 which activates motors 35 through OR gate 258 to operate lead screw 32 to rotate carriages 38 and 48 toward their receive positions. The logical one at point 257 also directly sets flip-flop 241 activating home position solenoids 121 and 123 to remove contact arms 65 and 70 from the housing 12, thus allowing carriages 38 and 48 to move to their receive positions.

Arrival of both carriages at the receive positions results in closing limit switches 62 and 66 and is detected by AND gate 219, the output of which is provided to line 218 during the one state. This causes the two state to be entered.

When the two state is entered motor 84 is driven with line 237 positive with respect to line 238 to raise load arm 76 as described hereinabove.

The three state is entered when limit 97 detects that the load arm has reached its up position. As may be seen from FIG. 20 the three state causes line 236 to be positive with respect to line 235 thus causing motor 35 to rotate in the opposite direction from its previous rotation driving carriages 38 and 48 toward the eject and load positions.

Arrival at one of the eject positions of carriage 48 and the load position for carriage 38 is detected by AND gate 226 which will cause entry of state counter 215 into the four state. Upon entry into the four state a logical one appears at point 259 clocking flip-flop 241 thus deactivating solenoids 121 and 123 allowing home position stops 65 and 70 to be inserted into the paths of the carriages. The logical one at point 259 causes motor 84 to be rotated in a direction which causes load arm 76 to load a new cassette onto dictation station 20 and to eject a cassette present at either the normal or priority eject position.

Limit switch 93 detects the arrival of load arm 76 at its down position thus causing entry into the five state. In the five state a logical one is provided to points 260 and 261. This logical one is provided through OR gate 258 to drive motor 35 in a direction which moves carriage 38 and 48 toward their home positions. The logical one also conditions NAND gate 265 to provide a logical zero output to point 266 upon the next occurrence of a logical one on line 218.

Motor 35 will so rotate until the arrival of carriages 38 and 48 at their home positions is detected by AND gate 228 causing a logical one to appear at line 218. This logical one at line 218 again triggers the clocking one shot 230 and also causes a logical zero to appear at point 266 through the action of NAND gate 265. The appearance of the zero at point 266 triggers a pair of negative edge triggered one shots 267 and 268. One shots 267 and 268 control the time the controller of FIG. 20 is in states six and seven, respectively.

The period of one shot 267 is selected such that, when the period of one shot 230 is considered, counter 215 will remain in the six state for the time required for proper operation of carrier release solenoid 167. Note that OR gate 269 drives motor 132 driving belt 125 during both the six and seven states of counter 215. Therefore the six state which is timed by one shot 267 is selected to be of a duration which will allow carrier release solenoid 167 to release one of carriers 135.

When one shot 267 times out a zero to one transition appears on its negated output which is provided through multiplexer 220 to line 218 thus causing entry into the seven state. Motor 132 will continue to rotate because of the presence of OR gate 269. The time duration of the seven state is controlled by one shot 268 which has a period selected so that it is of sufficient duration to allow carrier 135 to urge a cassette from the eject position across to the transcription station load opening. Therefore when one shot 268 times out one shot 230 will again be triggered thus causing state counter 215 to toggle from its seven state to its zero state in which it will remain until again disturbed by an output on line 250.

Note that entry into the seven state causes a logical one to appear at point 256 which triggers positive edge triggered one shot 270 providing a pulse on line 271. The pulse on line 271 is provided to the transcribe controller, a portion of which is shown as block 275. It is to be understood that OR gate 269t and motor 132t are the transcription side elements of the transcription side controller which correspond to OR gate 260 and motor 132 of the dictation side controller. It will be appreciated that the period of one shot 270 is selected to be of sufficient duration to drive motor 132t for a sufficient period of time to urge a cassette into dictate station load opening 21. This is to assure that if a dictator is dictating so as to use several cassettes in a period of time when a transcriber using the transcription side of the apparatus is working on only one cassette, cassettes will continually be provided into the dictate station load opening 21 for loading onto the dictation side transport deck 20.

Note that a corresponding line 276 is provided from a one shot which will be understood to be a one shot in the transcription controller corresponding to one shot 270 of the dictation side controller. Thus motor 132 will be provided with a short pulse sufficient to assure that cassettes are supplied into the transcription station load opening if the transcriber completes transcription of a plurality of cassettes while a dictator using the dictation side continues to dictate on only one cassette.

Note that the logical one at point 240 is provided along line 247t to the input of the lock out circuitry (not shown) associated with the transcription side controller which will be understood to be identical to lock out 246 of FIG. 220.

It is to be understood that the foregoing description of the preferred embodiment of the present invention is detailed and by way of example only and that other embodiments of the present invention may be constructed within the scope of the claims below.

I claim:

1. In a dictation/transcription apparatus including a first storage location for storing a plurality of recording cassettes, a dictation record/listen station, first conveying means for conveying individual cassettes from said first storage location to said dictation record/listen station, a second storage location for storing a plurality of said cassettes, and second conveying means for conveying said individual cassettes from said dictation record/listen station to said second storage location, the improvement comprising:
   a transcription listen station;
   third conveying means for conveying individual cassettes from said second storage location to said transcription listen station;
   fourth conveying means for conveying said individual cassettes from said transcription listen station to said first storage location;
   dictate eject means for initiating operation of said first conveying means and said second conveying means;
   means for providing a first input signal during operation of said third conveying means or said fourth conveying means;
   means for providing a second input signal during the absence of operation of said third conveying means and said fourth conveying means; and
   means responsive to said first input signal for preventing initiation of operation of said first conveying means and said second conveying means by said dictate eject means until said second input signal is provided.

2. The apparatus of claim 1, further comprising:
   transcribe eject means for initiating operation of said third conveying means and said fourth conveying means;
   means for providing a third input signal during operation of said first conveying means or said second conveying means;
   means for providing a fourth input signal during the absence of operation of said first conveying means and said second conveying means; and
   means responsive to said third input signal for preventing initiation of operation of said third conveying means and said fourth conveying means by said transcribe eject means until said fourth input signal is provided.

* * * * *